United States Patent [19]
Wada

[11] Patent Number: 5,437,344
[45] Date of Patent: Aug. 1, 1995

[54] MOUNTING APPARATUS FOR AUTOMOTIVE ENGINES

[75] Inventor: Manabu Wada, Shizuoka, Japan

[73] Assignee: Suzuki Motor Corporation, Hamamatsu, Japan

[21] Appl. No.: 184,454

[22] Filed: Jan. 21, 1994

[30] Foreign Application Priority Data

Jan. 22, 1993 [JP] Japan .................................. 5-027491

[51] Int. Cl.6 .............................................. B60K 5/12
[52] U.S. Cl. .................................. 180/291; 123/192.1
[58] Field of Search .................... 180/291, 298, 299; 123/192.1

[56] References Cited

U.S. PATENT DOCUMENTS

| | | | |
|---|---|---|---|
| 1,655,146 | 1/1928 | Hicks | 180/291 |
| 1,797,542 | 3/1931 | Brush | 180/291 |
| 2,300,631 | 11/1942 | Ormsby | 180/299 |
| 3,841,426 | 10/1974 | Nemschoff | 180/291 |

FOREIGN PATENT DOCUMENTS 12916  1/1989  Japan ................................. 180/291

*Primary Examiner*—Mitchell J. Hill
*Attorney, Agent, or Firm*—Gary M. Nath; John F. McGowan; Nath, Amberly & Associates

[57] ABSTRACT

Mounting apparatus for an automotive engine comprises: a mount bracket attached to one side of a cylinder block and having an extension with its end forwardly of the cylinder block of the engine; a boss extending from the front end of a manifold on the other side of the cylinder block; and a connector structurally joining the boss and the leading end of the mount bracket extension. A vibration absorbing mount is supported by the automobile body and supports engine weight through one of the bracket and connector.

9 Claims, 3 Drawing Sheets

MOUNTING APPARATUS FOR AUTOMOTIVE ENGINES

DETAILED DESCRIPTION OF THE INVENTION

1. Field of the Invention

The present invention relates to an automotive engine and, more particularly to mounting apparatus for the engine on the body.

2. Description of the Prior Art

When an engine is mounted in the engine compartment of an automobile, it is supported through mount members having a vibration absorbing component so as to prevent the vibrations of the engine from being transmitted to the body. A known construction is shown in FIGS. 2, 3 and 4. FIG. 2 is a top plan view showing the engine compartment of an automobile, and FIG. 3 is a front elevation taken in the direction of arrows A—A of FIG. 2. In these Figures, there are shown a body 1 of an automobile; an engine 2; an intake manifold 3; an exhaust manifold 4; and transmission 5. To the intake manifold 3, there is connected an air cleaner 7 through an air intake pipe 6.

When the engine is to be supported at its main axis of inertia in the engine compartment having the layout described above, mount members 8 are arranged in the positions indicated at a, b, c and d in FIGS. 3 and 4. The mount member 8 is attached at the position a by bolts fastened to the cylinder head or cylinder block between the runs of the timing belt of the engine 2.

These fastening constructions are specifically shown in FIG. 4. The engine 2 is equipped with a cylinder head cover 9, which is over a cylinder head (not shown) that is secured to a cylinder block 10, and an oil pan 11. A timing belt (not shown) runs at the end of the cylinder block 10 to the cylinder head and is covered with a timing belt cover 12. This timing belt cover 12 is formed with two holes 13, through which bolts (not shown) are passed to secure a bracket 14 to the cylinder block 10 or to the cylinder head.

The bracket 14 forms part of the mount member 8 together with a mount rubber 16. This mount rubber 16 is connected to the cylinder block 10 or the cylinder head by bolts (not shown) passing through the holes 15 of the bracket 14 and the holes 18 formed in the flange portion 17 of the mount rubber 16. A bracket 19 also forms part of the mount member 8 and is fixed on the body 1 (not shown in FIG. 4). This bracket 19 is formed at one end with a hole 20, which is aligned with a hole 21 formed at the center of the mount rubber 16, and a bolt (not shown) passes through the center hole 21 and the hole 20 of the bracket 19.

With the automotive engine mounting apparatus thus constructed according to the prior art, the engine 2 is supported by the body 1 through not only the mount member 8 at the position a but also the mount members 8 at the positions b to d, as indicated in FIG. 2. Due to the mount members 8, the vibrations of the engine 2 are prevented from being transmitted to the body 1.

In order to attach the mount members 8 to the engine 2, the structure described above requires special machining, which is difficult and expensive, for mounting the engine 2. Where a mount member 8 is attached to the cylinder head, its rigidity is hard to retain, thus causing deterioration of the sealing of the cylinder head to the cylinder block. To obtain the required rigidity of the cylinder head, which is not otherwise needed, there is caused an increase in weight, which is not desirable.

Japanese Utility Model Laid-Open No. 174752/1982 has disclosed a structure in which the engine body and the intake manifold are joined by gusset plates. However, this structure has failed to achieve the effect sought for by the present invention.

SUMMARY OF THE INVENTION

The present invention is a mounting apparatus for an automotive engine, comprising: a mount bracket comprising an inclined extension along one side of the cylinder block extending towards the front thereof, and a base attached to one side of the cylinder block; a boss formed as an extension of the front end of a manifold which is located on the other side of the cylinder block 5 and a connector bar (stiffener) joining the boss and the forward end of the mount bracket extension.

With this structure, the engine is partially supported by: the mount bracket attached at one side of the cylinder block; the boss formed as an extension at one end of the manifold which is on the opposite side of the cylinder block; the connector bar joining the boss and the forward end portion of the mount bracket; and a mount rubber supporting the mount bracket and the manifold and supported by the body. This supporting structure supports the engine at location a by two attachments to the engine, providing both economy by avoiding machining of the cylinder head, and avoiding a stronger than needed cylinder head.

DESCRIPTION OF THE PREFERRED EMBODIMENT

Figure 1:
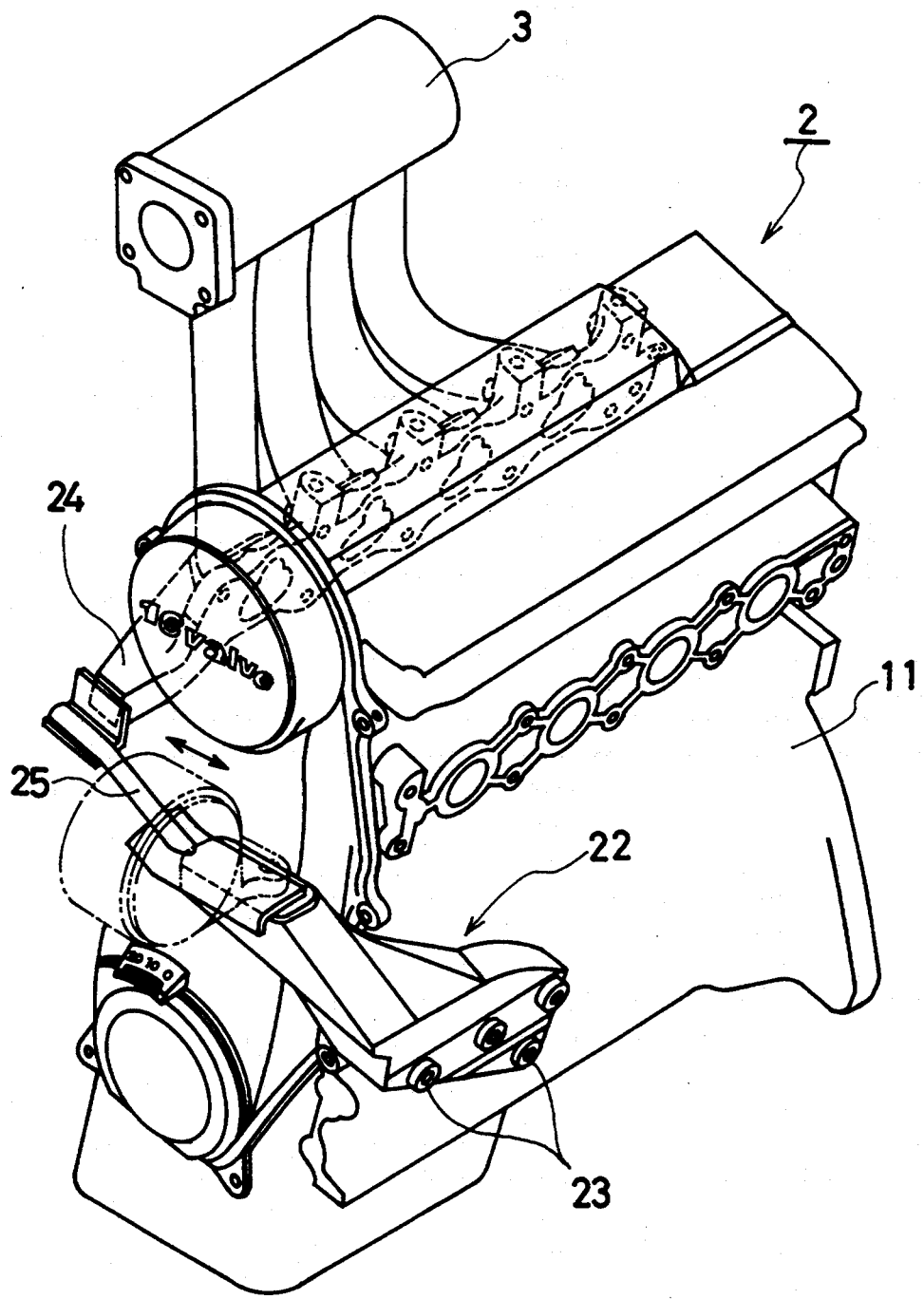
FIG. 1 is a perspective view showing one embodiment of the present invention.
Figure 2:
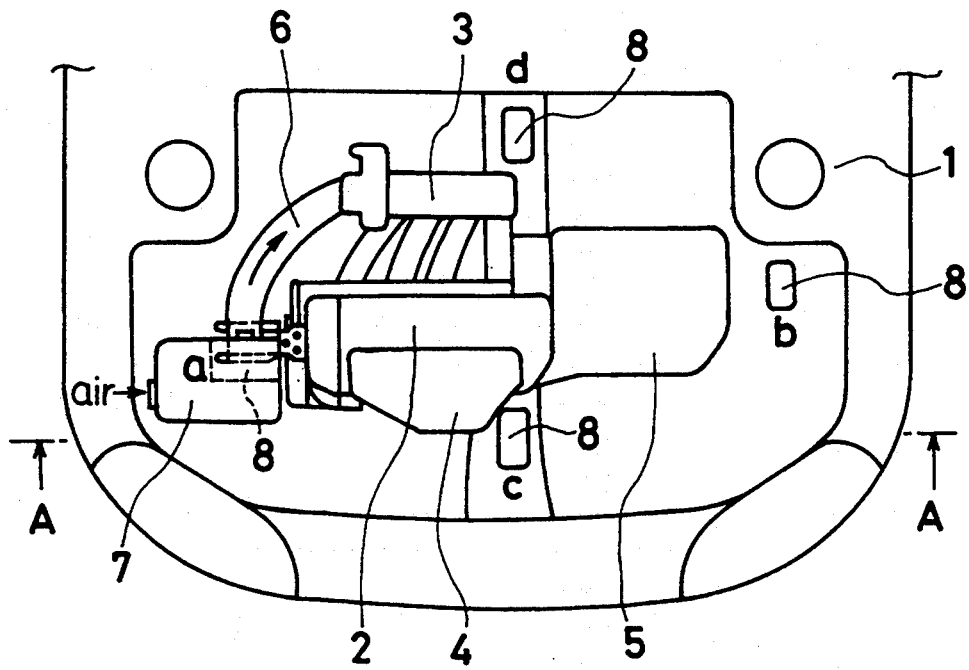
FIG. 2 is a top plan view showing a known engine compartment and engine of the automobile.
Figure 3:
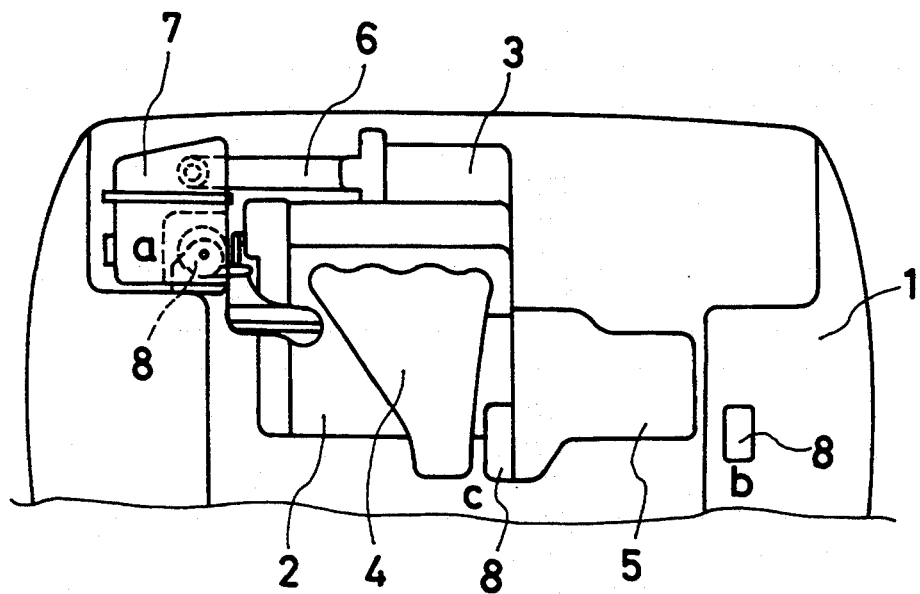
FIG. 3 is a front elevation taken in the direction of arrows A—A of FIG. 2.

An embodiment of the present invention is shown in FIG. 1. The mounting apparatus of the present invention includes a mount bracket 22 comprising a base and an inclined extension which is along one side of cylinder block 10 of the engine 2, extending towards and beyond the front end of the engine 2. This mount bracket 22 has its base attached to one side of the cylinder block 10 at a location spaced form the front end of the engine 2 by bolts 23. A boss 24 is formed by extending one end of the intake manifold 3, which is on the other side of the engine from the mount bracket 22, with its end beyond the front end of the engine 2.

The end of the inclined extension of bracket 22 is horizontal and to it is secured an angled plate. The flange 17 of mount rubber 26 is secured to the angled plate by bolts (not shown). The angled plate has an extension, to which is secured, as by welding, one end of a connector bar 25. The other end of connector bar 25 is secured to a second angled plate that is attached to the end of the boss 24 on intake manifold 3. A bracket 19, attached to the body 1 (see FIG. 4), is adjacent mount rubber 16, and a bolt (not shown) joins them together.

Figure 4:
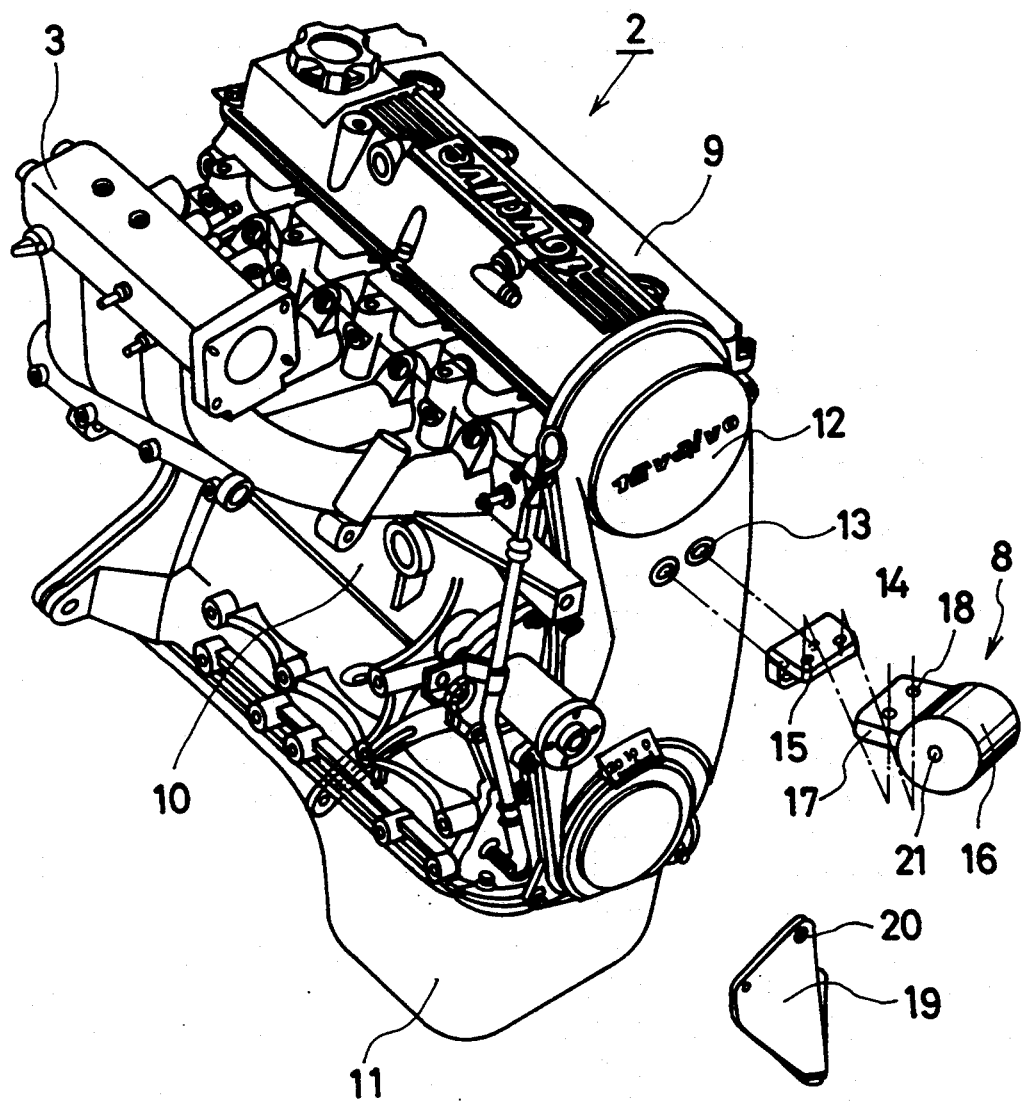
FIG. 4 is a partially exploded perspective view showing an engine mounting apparatus of the prior art.

The automotive engine supporting and mounting apparatus according to the present invention is constructed, as described above, without requiring modification of the front of the engine block or of the cylinder head, and thus is unlike the structure of the prior art shown in FIG. 4. This makes it possible to employ parts which are common to those of different kinds of engines. Moreover, the invention apparatus has a lighter weight and a lower cost than the conventional structure.

What is claimed is:

1. A device for mounting an automotive engine comprising:
    an engine having front and rear, said engine further having a cylinder block, said cylinder block having a forward and rear ends and opposed first and second sides, and further comprising a manifold attached to said engine cylinder block first side;
    a mount bracket, said mount bracket having a forward end and an aft end, said aft end of said mount bracket attached to said second side of said cylinder block, said mount bracket extending in a bent manner to said front of said engine;
    a boss formed by extending one end of said manifold attached to said engine cylinder block first side; and
    a stiffener joining said boss and said forward end of said mount bracket.

2. Apparatus for supporting an engine on a body comprising:
    an engine having a front and rear, said engine further having a cylinder block, said cylinder block having forward and rear ends and opposed first and second sides, and further comprising a manifold attached to said engine cylinder block first side;
    a mount bracket,
    a connector structurally joining said manifold and said mount bracket;
    a vibration absorbing mount supported by the body; and
    a structure connecting at least one of said connector and said mount bracket to said vibration absorbing mount, whereby the weight of the engine is transmitted through said mount bracket to said manifold to said vibration absorbing mount.

3. The apparatus of claim 2, wherein said mount bracket comprises a forward and aft end, further having a base at said mounting bracket aft end attached to said engine at a location spaced from said engine cylinder block forward end, said mount bracket further comprising an extension at said mount bracket forward end protruding beyond said forward end of said cylinder block of said engine.

4. The apparatus of claim 3, said connector being connected of said extension.

5. The apparatus of claim 3, said structure connecting said mount to said extension.

6. The apparatus of claim 3, said structure connecting said vibration absorbing mount to said end of said extension.

7. The apparatus of claim 2, said manifold having a boss extending toward the front of said engine, said connector being joined to said boss.

8. The apparatus of claim 7, and further comprising a plate attached to said boss, and said connector joined to said plate.

9. The apparatus of claim 8, said plate being an angled plate.

* * * * *